United States Patent [19]

Hatakeyama

[11] Patent Number: 5,243,870
[45] Date of Patent: Sep. 14, 1993

[54] THREE-SHAFT TYPE AUTOMATIC TRANSMISSION

[75] Inventor: Kazuma Hatakeyama, Saitama, Japan

[73] Assignee: Honda Giken Kogyo Kabushiki Kaisha, Tokyo, Japan

[21] Appl. No.: 855,522

[22] Filed: Mar. 23, 1992

[30] Foreign Application Priority Data

May 8, 1991 [JP] Japan .................. 3-102823

[51] Int. Cl.⁵ ............................................. F16H 3/93
[52] U.S. Cl. ........................................ 74/331; 74/333
[58] Field of Search .................. 74/322, 325, 331, 333, 74/745

[56] References Cited

U.S. PATENT DOCUMENTS

| | | | |
|---|---|---|---|
| 4,738,149 | 4/1988 | Janiszewski | 74/331 X |
| 4,776,227 | 10/1988 | Janiszewski | 74/331 |
| 5,014,566 | 5/1991 | Kashiwase | 74/331 |
| 5,031,473 | 7/1991 | Yumoto et al. | 74/331 X |
| 5,036,717 | 8/1991 | Nakayama et al. | 74/333 |
| 5,079,965 | 1/1992 | Leber et al. | 74/331 |

FOREIGN PATENT DOCUMENTS 0328377 2/1989 European Pat. Off. .
2225819 11/1989 United Kingdom .

OTHER PUBLICATIONS

Patent Abstracts of Japan, vol. 1, No. 43, Apr. 26, 1977, No. 51-151 452.
Patent Abstracts of Japan, vol. 10, No. 14, Jan. 21, 1986, No. 60-175 844.

Primary Examiner—Leslie A. Braun
Assistant Examiner—Khoi Q. Ta
Attorney, Agent, or Firm—Armstrong, Westerman, Hattori, McLeland & Naughton

[57] ABSTRACT

In a three-shaft type automatic transmission, a fifth frictionally engaging element is mounted on a second central shaft, and first and second frictionally engaging elements and third and fourth frictionally engaging elements are mounted respectively on first and third shafts which are disposed on opposite sides of the second shaft. When one of the first and third shafts is used as an input shaft, the second shaft is an output shaft. When one of the first and third shafts is used as an output shaft, the second shaft is an input shaft. The first and second frictionally engaging elements and the third and fourth frictionally engaging elements on the opposite sides of the second shaft are symmetrically disposed to reduce dead space and make the transmission case small. Because the positional relationship between the input and output shafts can be transposed, the property of the transmission for general purpose is enhanced.

5 Claims, 11 Drawing Sheets

THREE-SHAFT TYPE AUTOMATIC TRANSMISSION

BACKGROUND OF THE INVENTION

1. Field of the Invention L This invention relates to an automatic transmission designed to selectively establish a plurality of gear shift stages by fixing gears to a rotary shaft through frictionally engaging elements, and, more particularly, to a three-shaft type automatic transmission including a sub-shaft in addition to an input shaft and an output shaft.

2. Description of the Prior Art

There are conventionally known three-shaft type automatic transmission such as described in Japanese Patent Application Laid-open No. 175844/85.

Such conventional three-shaft type automatic transmission includes an output shaft and a sub-shaft disposed in parallel on opposite sides of a central input shaft connected to an engine through a torque converter and is designed, so that any of first to fifth gear shift stages may be selectively established between the input shaft and the output shaft by means of two frictionally engaging elements mounted on the input shaft, two frictionally engaging elements mounted on the sub-shaft and one frictionally engaging element mounted on the output shaft.

In such three-shaft type automatic transmission, however, the sub-shaft, having the two frictionally engaging elements, and the output shaft, having the one frictionally engaging element, are disposed on opposite sides of the central input shaft having two frictionally engaging elements. Therefore, the frictionally engaging elements, each having a relatively large size, are laid out unsymmetrically with respect to the central input shaft. For this reason, the internal space in the transmission case is not effectively utilized. Hence, it is difficult to reduce the size of the transmission case. Another problem is that it is impossible to freely change the positional relationship among the input shaft, the output shaft and the sub-shaft, thereby impairing the degree of freedom of layout when these shafts are mounted in a vehicle, and impairing a property for general purpose.

SUMMARY OF THE INVENTION

Accordingly, it is an object of the present invention to provide a three-shaft type automatic transmission having small size and excellent property for general purpose.

To achieve the above object, according to a first aspect and feature of the present invention, there is provided a three-shaft type automatic transmission having a first shaft and a third shaft disposed in parallel on opposite sides of a second central shaft, comprising first and second gears relatively rotatably carried on the first shaft, first and second frictionally engaging elements capable of fixing the first and second gears to the first shaft, and a ninth gear secured to the first shaft; third and fourth gears relatively rotatably carried on the third shaft, third and fourth frictionally engaging elements capable of fixing the third and fourth gears to the third shaft, a tenth gear secured to the third shaft, fifth to eighth gears secured to the second shaft and meshed with the first to fourth gears, respectively, an eleventh gear relatively rotatably carried on the second shaft and meshed with the ninth and tenth gears, and a fifth frictionally engaging element capable of fixing the eleventh gear to the second shaft.

With the first feature of the present invention, the number of gears mounted on the first and third shafts, disposed on the opposite sides of the second shaft, is the same as the number of frictionally engaging elements, and the arrangements of the gears on the first and second shafts and the gears on the third and second shafts are the same. Therefore, it is possible to dispose the gears and the frictionally engaging elements substantially symmetrically with respect to the second shaft. Consequently, an internal space in the transmission case is effectively utilized, thereby eliminating dead space in the transmission case and enabling reduction in size of the transmission case. Moreover, any one of the first to third shaft can be used as an input shaft, and any of said shafts can be used as an output shaft, leading to an increased degree of freedom of lay-out in the use of the automatic transmission and providing a high property for general purpose.

In addition to the above first feature, a second feature of the present invention is that either one of the first and third shafts is an input shaft, and the second shaft is an output shaft.

With the second feature, the first or third shaft, located at an outer side, can be used as an input shaft, and the second shaft, located centrally, can be used as an output shaft.

In addition to the first feature, a third feature of the present invention is that the second shaft is an input shaft, and either one of the first and third shafts is an output shaft.

With the third feature, the second shaft, located centrally, can be used as an input shaft, and the first or third shaft, located at an outer side, can be used as an output shaft.

In addition to the first feature, a fourth feature of the present invention is that a gear shift drive, with the ninth to eleventh gears not lying in a power transmitting path from the input shaft to the output shaft, is a high speed gear shift drive, and a gear shift drive with the ninth to eleventh gears lying in the power transmitting path is a low speed gear shift drive.

With the fourth feature, the number of gears used during cruising of the vehicle is reduced, thereby enabling both an improvement in specific fuel consumption and a reduction in gear noise.

Further, in addition to the first feature, a fifth feature of the present invention is that a gear shift drive, established by engagement of the fifth frictionally engaging element, has a reduction gear ratio larger than 1.

With the fifth feature, reduction gear trains, for establishing first and second low speed gear shift drives, can be utilized for a third gear shift drive, thereby enabling a reduction in the number of gears.

The above and other objects, features and advantages will become apparent from a consideration of the following description of the preferred embodiments, taken in conjunction with the accompanying drawings.

BRIEF DESCRIPTION OF THE DRAWINGS

FIGS. 1 to 7 illustrate a first embodiment of the present invention, wherein

FIG. 1 is a diagram illustrating the entire automatic transmission;

FIG. 2 is an enlarged view of a portion indicated by 2 in FIG. 1;

FIG. 3 is an enlarged view of a portion indicated by 3 in FIG. 1;

FIG. 4 is an enlarged view of a portion indicated by 4 in FIG. 1;

FIG. 5 is an enlarged view of a portion indicated by 5 in FIG. 1;

FIG. 6 is a view taken along an arrow 6 in FIG. 1;

FIG. 7 is a schematic diagram of the automatic transmission;

DESCRIPTION OF THE PREFERRED EMBODIMENTS

The present invention will now be described by way of embodiments in connection with the accompanying drawings.

Figure 1:
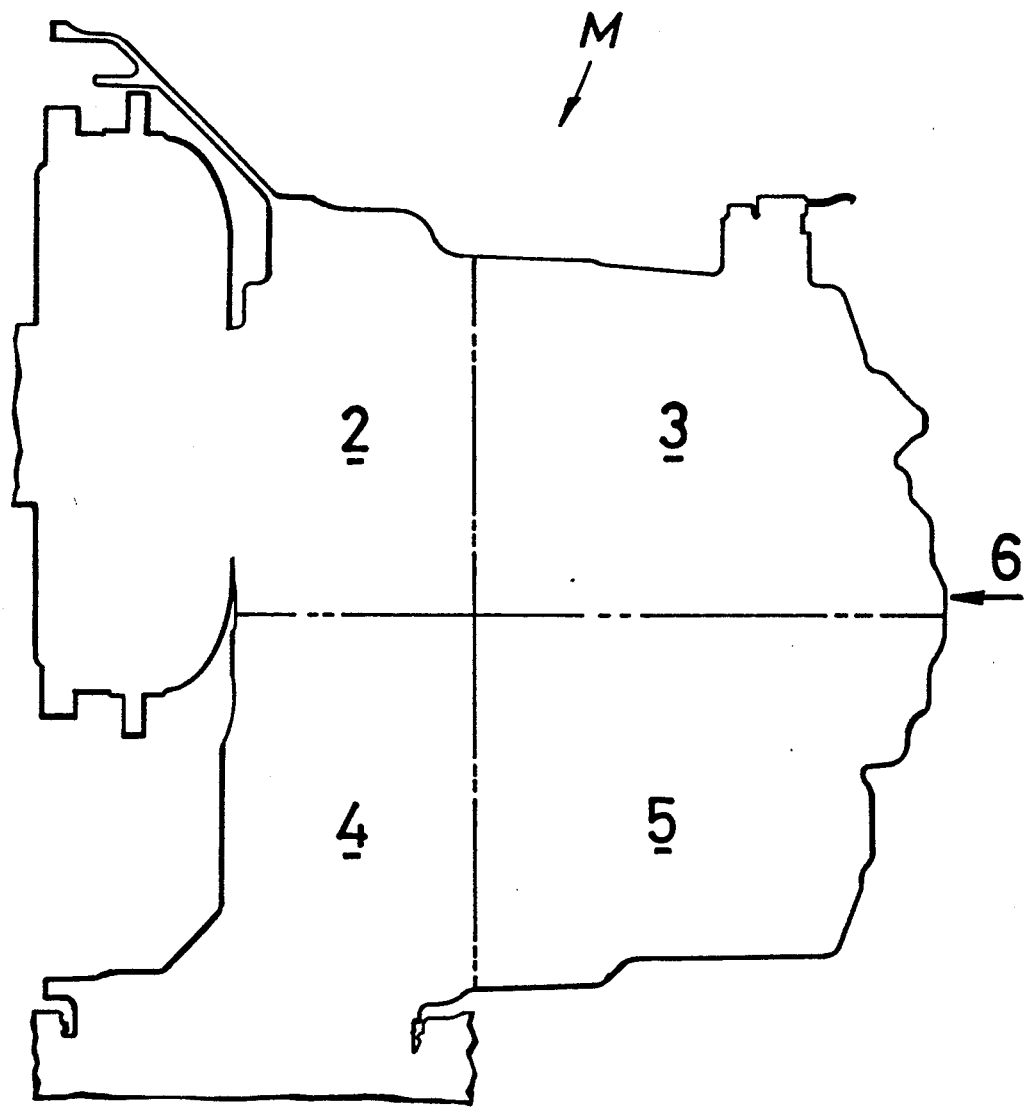
Figure 2:
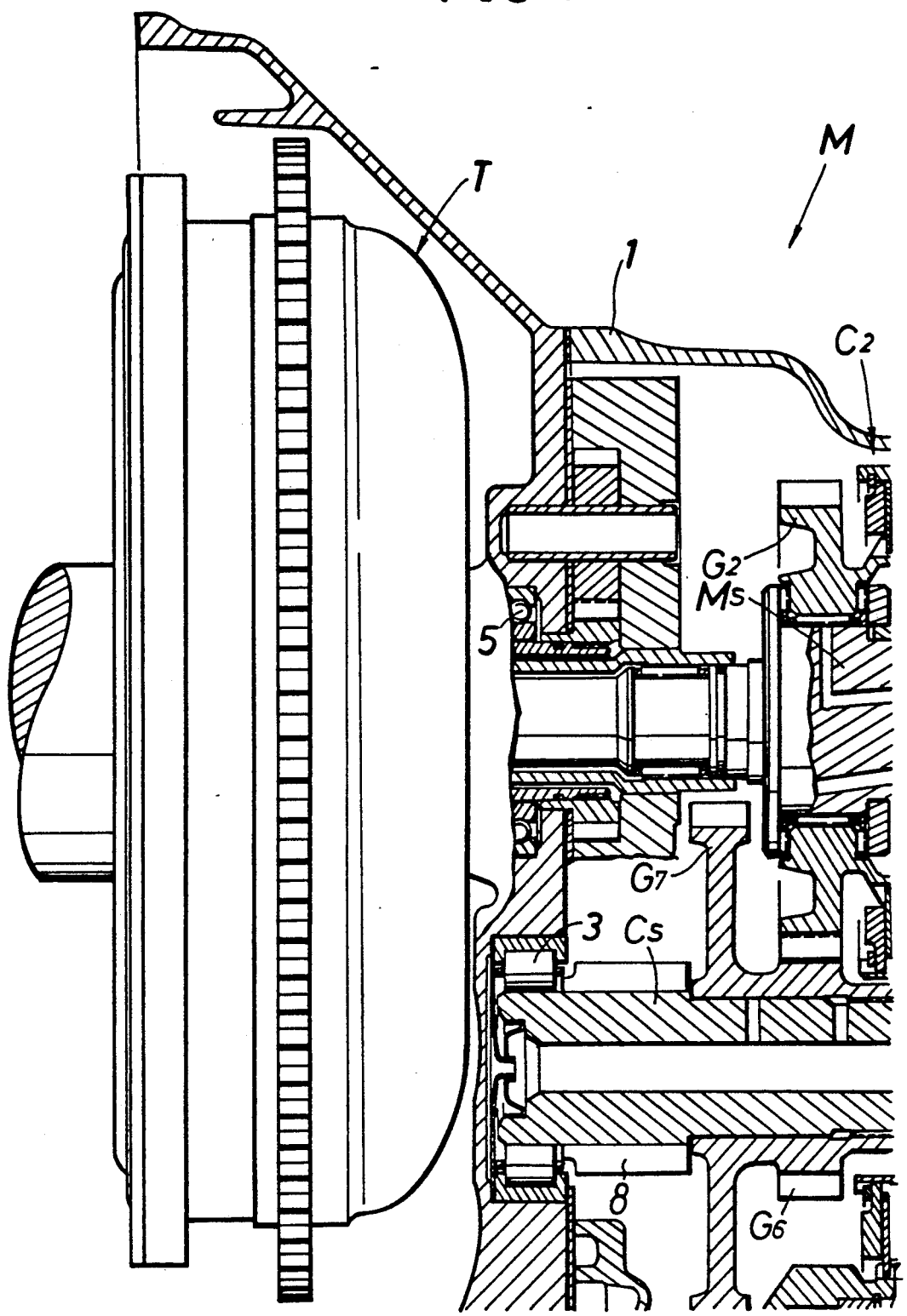
Figure 3:
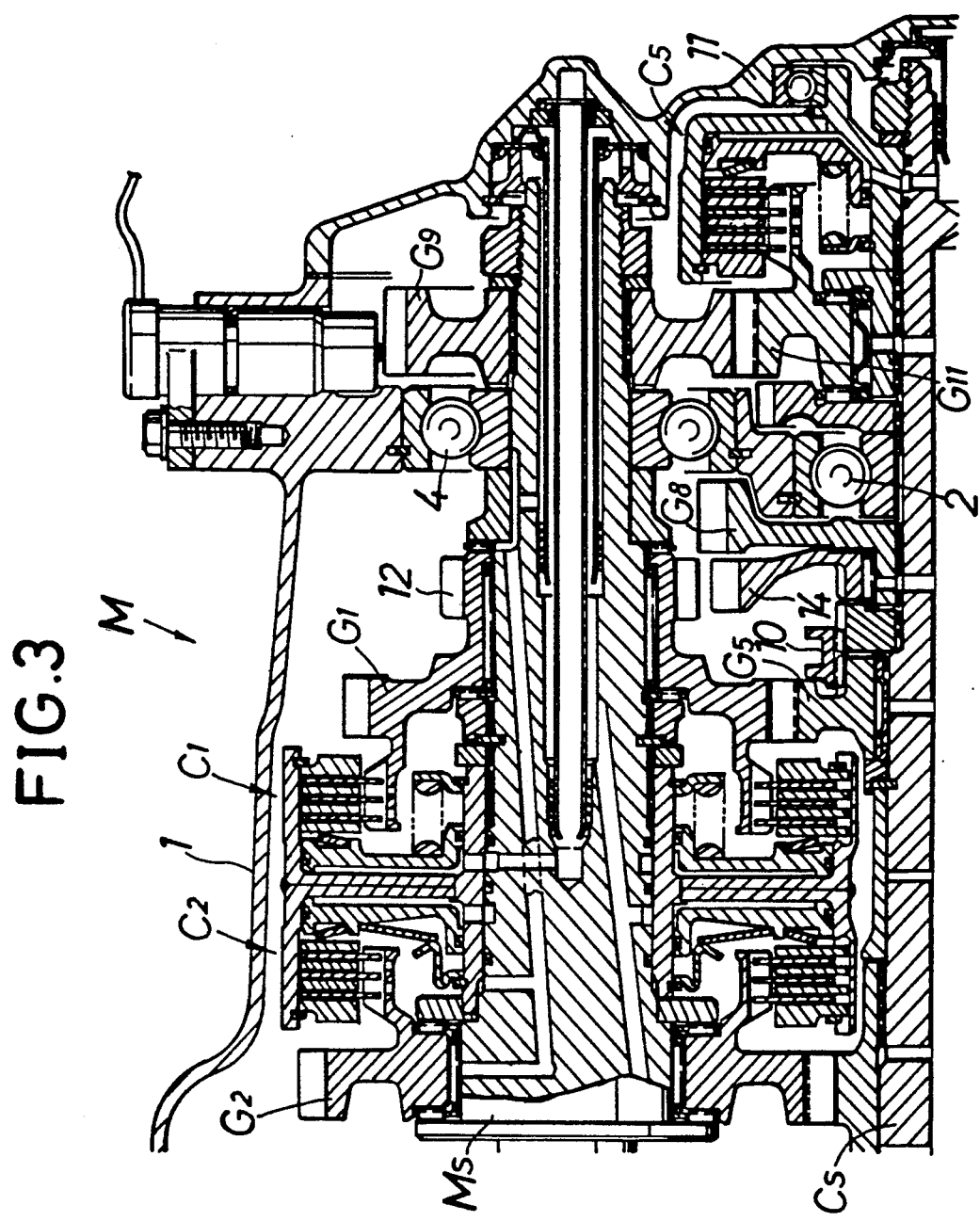
Figure 4:
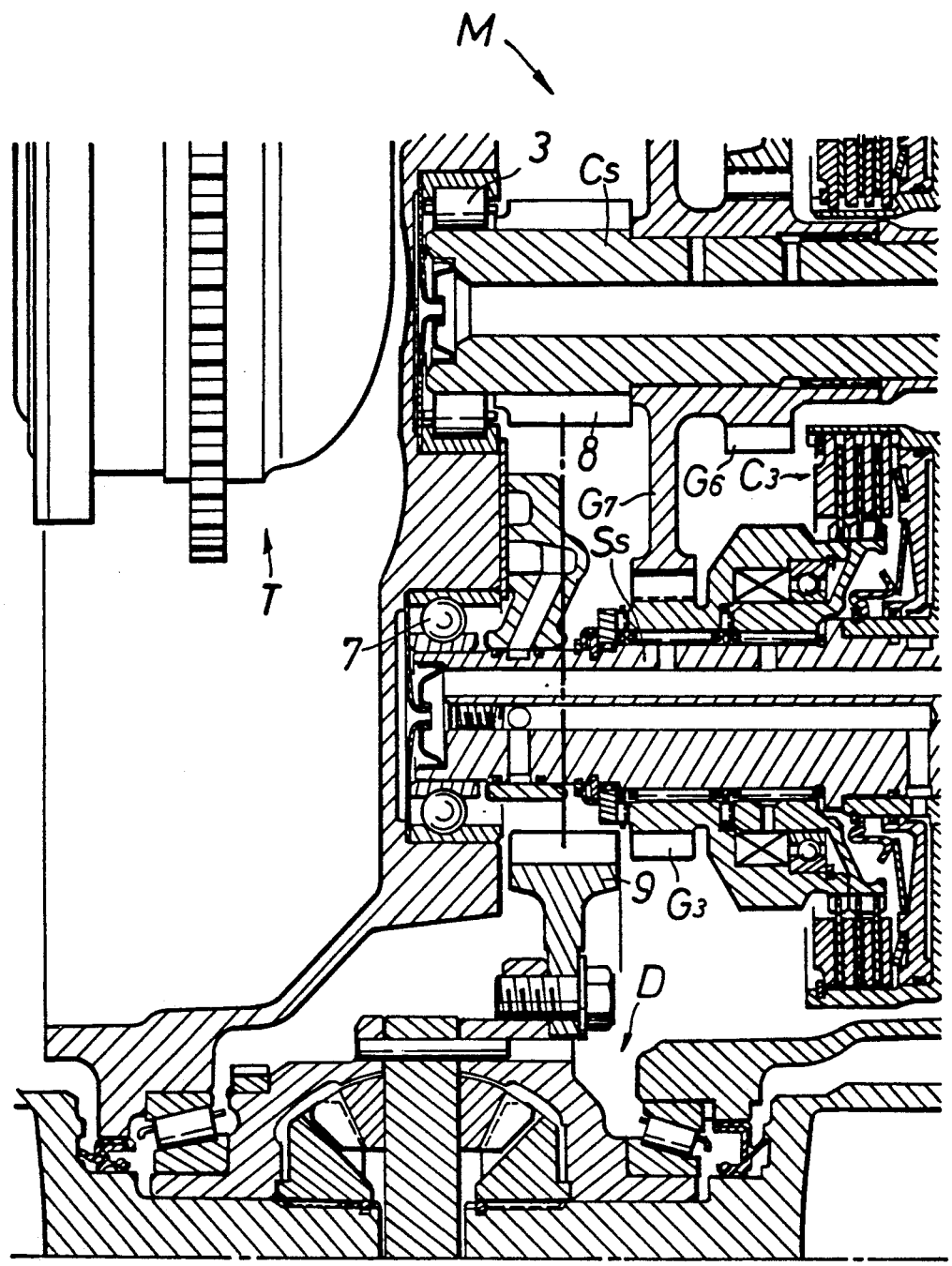
Figure 5:
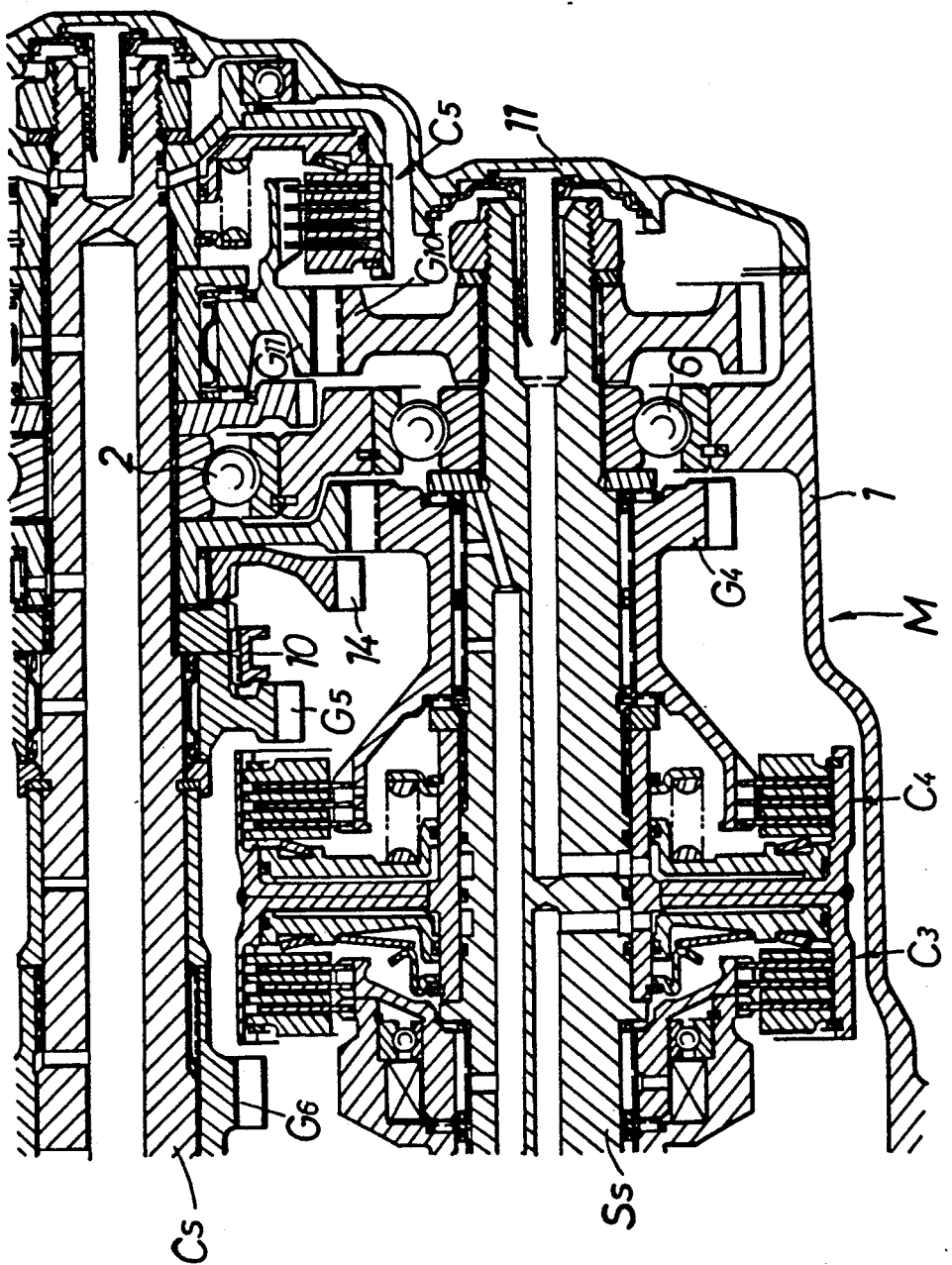
Figure 6:
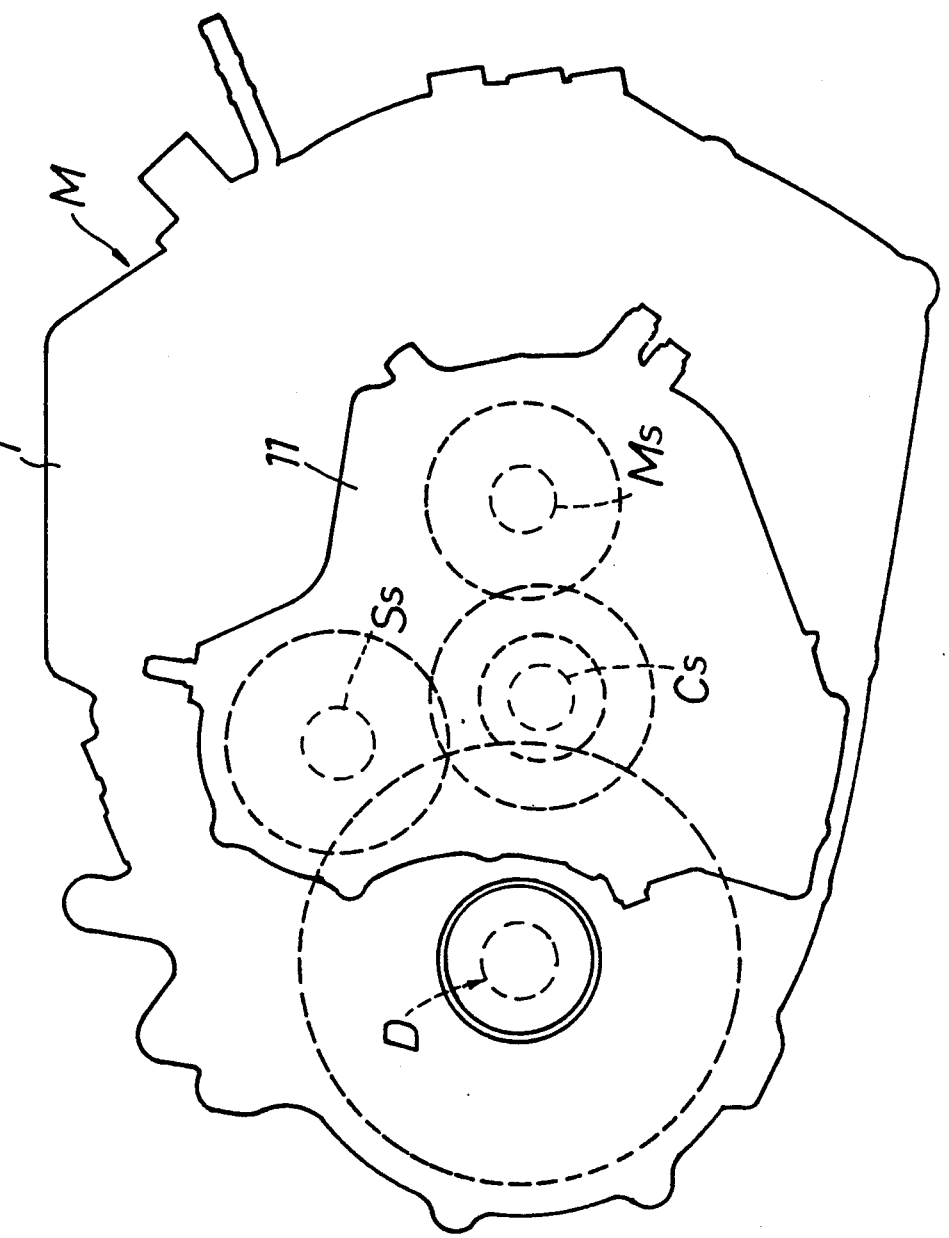
Figure 7:
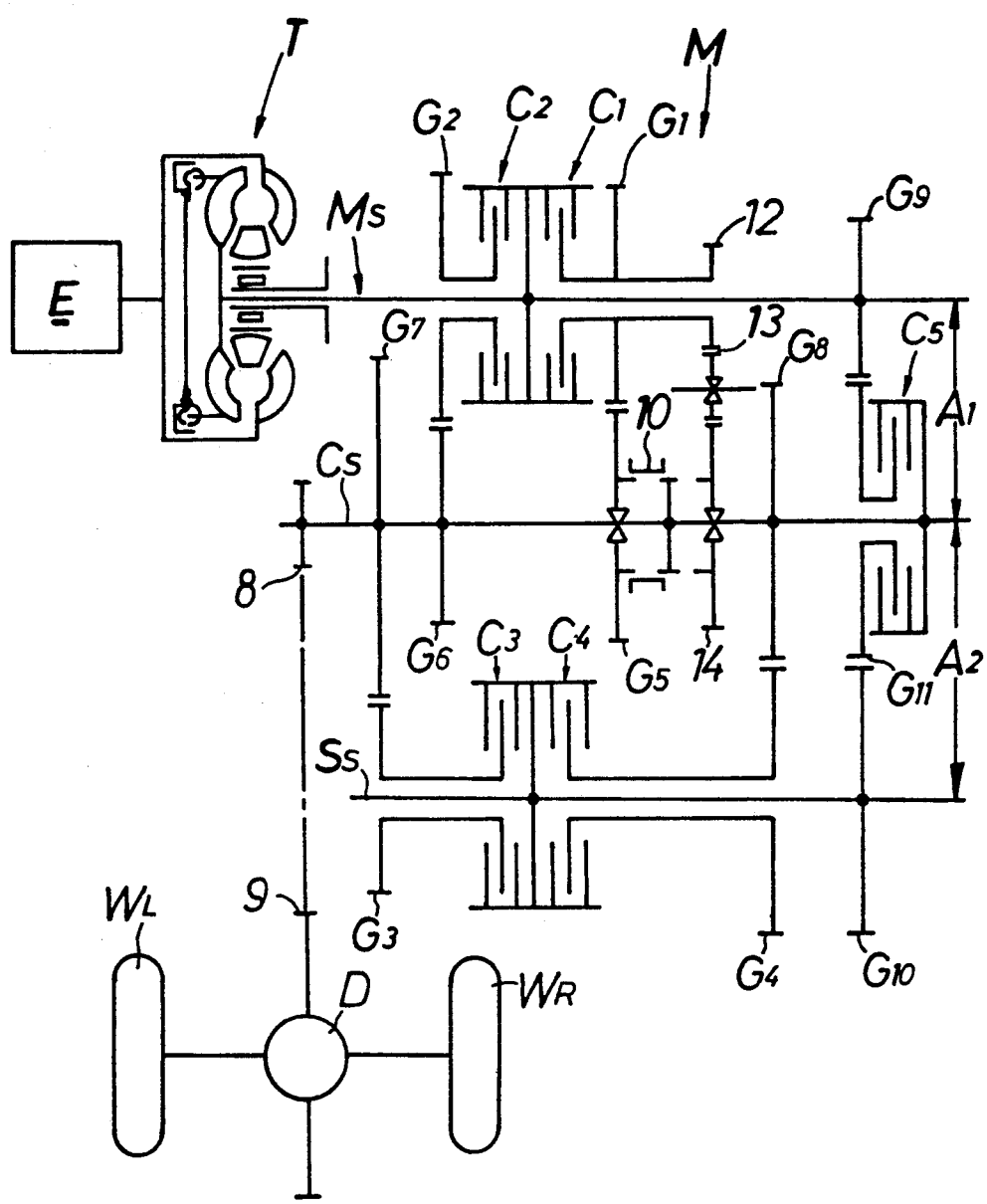

Referring to FIGS. 1 to 7, illustrating a first embodiment of the present invention, a three-shaft type automatic transmission M for a vehicle comprises an input shaft Ms, FIGS. 2 and 3, an output shaft Cs, FIGS. 2, 3, 4 and 5, and a sub-shaft Ss, FIGS. 4 and 5, which are disposed in parallel to one another. The output shaft Cs is supported at a central portion of a transmission case 1 through a ball bearing 2, FIGS. 3 and 5, and a roller bearing 3, FIG. 4. The input shaft Ms is supported forwardly of the output shaft Cs through a pair of ball bearings 4, FIG. 3, and 5, FIG. 2, and the sub-shaft Ss is supported rearwardly of and above the output shaft Cs through a pair of ball bearings 6, FIG. 5, and 7, FIG. 4. Torque from an engine E, FIG. 7, is transmitted through a torque converter T, FIGS. 2, 4 and 7, to the input shaft Ms, FIGS. 2, 3, 6 and 7, and further from the output shaft Cs, FIGS. 2-7, through a final drive gear 8, FIGS. 2, 4, 7 and 8, a final driven gear 9, FIGS. 7 and 8, and a differential D disposed rearwardly of the output shaft Cs to left and right wheels $W_L$ and $W_R$.

Figure 8:
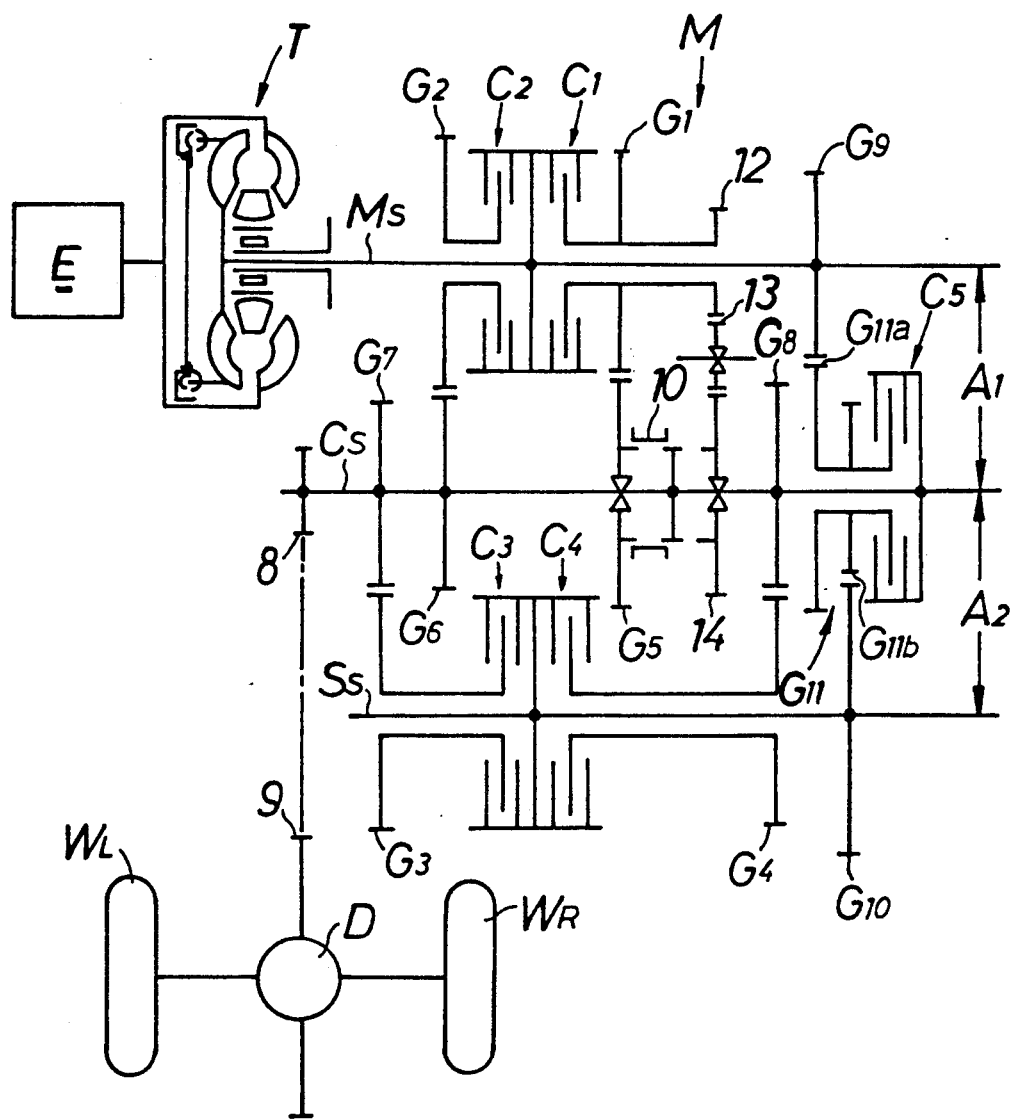
FIG. 8 is a schematic diagram of an automatic transmission of a second embodiment.

A first gear $G_1$, FIG. 3, and a second gear $G_2$, FIGS. 2, 3, 7 and 8, are relatively rotatably carried on the input shaft Ms The first gear $G_1$ is fixed to the input shaft Ms by a first friction-ally engaging element $C_1$, FIGS. 3, 7 and 8, serving as a fourth gear shift clutch, while the second gear $G_2$ is fixed to the input shaft Ms by a second frictionally engaging element $C_2$, FIGS. 2, 3, 7 and 8, serving as a fifth gear shift clutch. The first and second frictionally engaging elements $C_1$ and $C_2$ are disposed back to back and contained in a widthwise central portion, FIG. 3, of the transmission case 1. A ninth gear $G_9$, FIGS. 2, 4, 7 and 8, is fixed to the input shaft Ms for transmitting a forward driving force to the output shaft Cs and the sub-shaft Ss, FIGS. 7 and 8.

A third gear $G_3$, FIGS. 4, 7 and 8, and a fourth gear $G_4$, FIGS. 5, 7 and 8, are relatively rotatably carried on the sub-shaft Ss. The third gear $G_3$ is fixed to the sub-shaft Ss by a third frictionally engaging element $C_3$, FIGS. 5, 7 and 8, serving as a first gear shift clutch, while the fourth gear $G_4$ is fixed to the sub-shaft Ss by a fourth frictionally engaging element $C_4$ serving as a second gear shift clutch. The third and fourth frictionally engaging elements $C_3$ and $C_4$ are disposed back to back and contained in a widthwise central portion of the transmission case 1 in an opposed relation to the first and second frictionally engaging element $C_1$ and $C_2$ on opposite sides of the output shaft Cs, respectively. A tenth gear $G_{10}$, FIGS. 5, 7 and 8, to which the forward driving force is transmitted from the input shaft Ms, is also fixed to the sub-shaft Ss.

Fixed to the output shaft Cs are a sixth gear $G_6$, FIGS. 2, 5, 7 and 8, meshed with the second gear $G_2$ on the input shaft Ms, and a seventh gear $G_7$ and an eighth gear $G_8$ meshed with the third and fourth gears $G_3$ and $G_4$ on the sub-shaft Ss, respectively. A fifth gear $G_5$, FIGS. 3, 5, 7 and 8, is also relatively rotatably carried on the output shaft Cs and meshed with the first gear $G_1$ on the input shaft Ms. The fifth gear $G_5$ is fixed to the output shaft Cs by a forward and backward movement switchover mechanism 10, FIGS. 3, 5, 7 and 8. Further, an eleventh gear $G_{11}$, FIGS. 3, 5, 7 and 8, is relatively rotatably carried on the output shaft Cs and meshed with the ninth gear $G_9$ on the input shaft Ms and the tenth gear $G_{10}$ on the sub-shaft Ss. The eleventh gear $G_{11}$, FIGS. 3, 5, 7 and 8, is fixed to the output shaft Cs by a fifth frictionally engaging element $C_5$ serving as a third gear shift clutch. The fifth frictionally engaging element $C_5$ is disposed at an end of the output shaft Cs and covered by a side cover 11, FIG. 5, which closes an opening in the transmission case 1. The tenth and eleventh gears $G_{10}$ and $G_{11}$, FIGS. 5, 7 and 8, have the same number of teeth, and the ninth gear $G_9$ has a number of teeth set smaller than those of the tenth and eleventh gears $G_{10}$ and $G_{11}$. Thus, a distance $A_1$, FIGS. 7 and 8, between the input shaft Ms and the output shaft Cs is smaller than a distance $A_2$ between the output shaft Cs and the sub-shaft Ss, so that the rotation of the input shaft Ms is reduced in speed by the ninth and eleventh gears $G_9$ and $G_{11}$ and transmitted to the output shaft Cs or the sub-shaft Ss.

A reverse drive gear 12, FIGS. 3, 7 and 8, formed integrally with the first gear $G_1$ on the input shaft Ms, is meshed with a reverse driven gear 14, FIGS. 3, 5, 7 and 8, relatively rotatably carried on the output shaft Cs through a reverse idle gear 13. The reverse driven gear 14 is fixed to the output shaft Cs by the forward and backward movement switchover mechanism 10, FIGS. 3, 7 and 8.

The first frictionally engaging element $C_1$, FIG. 3, of the input shaft Ms and the fourth frictionally engaging element $C_4$, FIG. 5, of the sub-shaft Ss are disposed substantially symmetrically with respect to the output shaft Cs interposed therebetween, and the second frictionally engaging element $C_2$ of the input shaft Ms and the third frictionally engaging element $C_3$ of the sub-shaft Ss are likewise disposed substantially symmetrically with respect to the output shaft Cs. This eliminates waste space in transmission case 1, reducing the size of transmission case 1. In addition, fifth frictionally engaging element $C_5$, mounted at the end of central output shaft Cs, is easy to mount and remove. Modification from a five-gear shift automatic transmission to a four-gear shift automatic transmission can easily be carried out by removing the fifth frictionally engaging element $C_5$.

The operation of the first embodiment having the above-described construction will be described below.

During forward traveling of the vehicle, forward and backward movement switchover mechanism 10 is in a left position, as shown in FIG. 3, wherein fifth gear $G_5$ has been fixed to output shaft Cs, and reverse driven gear 14 has been separated from output shaft Cs. When third frictionally engaging element $C_3$ is brought into engagement in this condition, rotation of input shaft Ms is transmitted sequentially through ninth gear $G_9$, eleventh gear $G_{11}$, tenth gear $G_{10}$, sub-shaft Ss, third frictionally engaging element $C_3$, third gear $G_3$ and seventh gear $G_7$ to output shaft Cs to establish a first gear shift drive, and further transmitted therefrom through final drive gear 8, final driven gear 9 and differential D to left and right wheels $W_L$ and $W_R$.

When engagement of third frictionally engaging element $C_3$ is released and fourth frictionally engaging element $C_4$ is engaged, the rotation of input shaft Ms is transmitted, sequentially, through ninth gear $G_9$, eleventh gear $G_{11}$, tenth gear $G_{10}$, sub-shaft Ss, fourth frictionally engaging element $C_4$, fourth gear $G_4$ and eighth gear $G_8$ to output shaft Cs establishing a second gear shift drive.

When both first and second gear shift drives are established, first state speed-reduction is effected by ninth and eleventh gears $G_9$ and $G_{11}$, and second stage speed-reduction is effected between third and seventh gears $G_3$ and $G_7$ or between fourth and eighth gears $G_4$ and $G_8$. The speed-reduction is effected at a plurality of stages in this manner. Therefore, load on each gear can be reduced to improve durability, and the degree of freedom for establishing the gear shift can be enhanced.

When fourth frictionally engaging element $C_4$ is released and fifth frictionally engaging element $C_5$ is engaged, rotation of input shaft Ms is transmitted, while being reduced in speed, sequentially through ninth gear $G_9$, eleventh gear $G_{11}$, and fifth frictionally engaging element $C_5$ to output shaft Cs establishing third gear shift drive.

When fifth frictionally engaging element $C_5$ is released and first frictionally engaging element $C_1$ is brought into engagement, rotation of input shaft Ms is transmitted sequentially through first frictionally engaging element $C_1$, first gear $G_1$, fifth gear $G_5$ and forward and backward movement switchover mechanism 10 to output shaft Cs establishing fourth gear shift drive.

When first frictionally engaging element $C_1$ is released and second frictionally engaging element $C_2$ is engaged, rotation of input shaft Ms is transmitted sequentially through second frictionally engaging element $C_2$, second gear $G_2$ and sixth gear $G_6$ to output shaft Cs establishing a fifth gear shift drive.

When fourth and fifth gear shift drives are established, rotation of input shaft Ms is transmitted through the minimum number of gears comprising first and fifth gears $G_1$ and $G_5$ or second and sixth gears $G_2$ and $G_6$ to output shaft Cs, thereby enabling improvement in fuel consumption and reduction in gear noise during cruising of the vehicle.

In a state where first frictionally engaging element $C_1$, is in engagement, if forward and backward movement switchover mechanism 10 is shifted to a right position, rotation of input shaft Ms is transmitted as a reverse rotation sequentially through first frictionally engaging element $C_1$, reverse drive gear 12, reverse idle gear 13, reverse driven gear 14, and forward and backward movement switchover mechanism 10 to output shaft Cs, establishing reverse gear shift drive.

Figure 9:
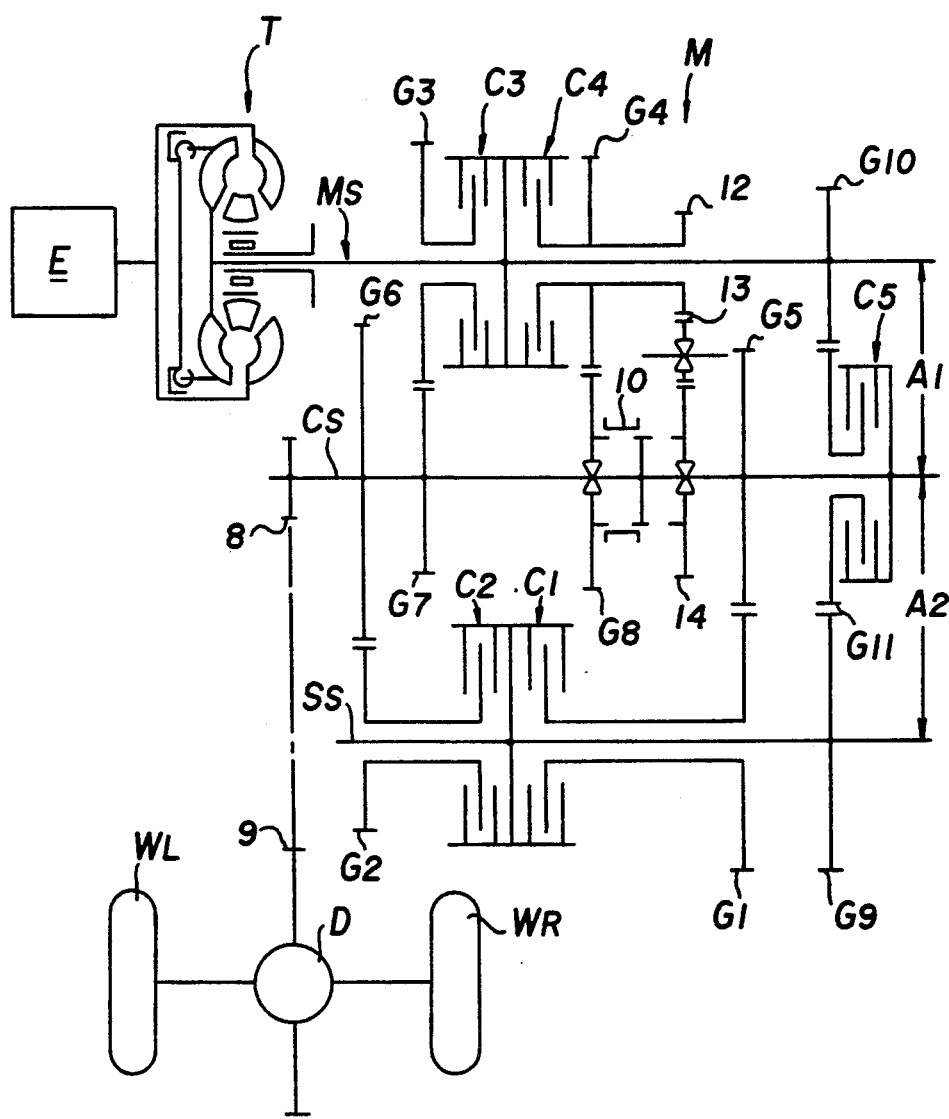
FIG. 9 is a schematic diagram showing a first modified form of the transmission of the instant invention.

Since automatic transmission M comprises input shaft Ms and sub-shaft Ss on opposite sides of output shaft Cs, and gear and frictionally engaging element provided on input shaft Ms and sub-shaft Ss are disposed substantially symmetrically, with respect to the output shaft Cs interposed therebetween, as described above, it is possible to transpose positional relationship between input shaft Ms and sub-shaft Ss such that, the input shaft Me in FIG. 7 is a sub-shaft Ss in FIG. 9, while the sub-shaft Ss in FIG. 7 is an input shaft Ms in FIG. 9, by a slight modification in design, such as, modification of the number of teeth of each gear, thereby substantially enhancing transmission M for general purpose. Moreover, because dead space in transmission case 1 is reduced, it is possible to reduce the size of transmission case 1. Further, because fifth frictionally engaging element $C_5$, mounted at the end of the central output shaft Cs, is easy to mount and remove, it is possible to readily modify the five-gear shift automatic transmission to a four-gear shift automatic transmission merely by removing fifth frictionally engaging element $C_5$.

Figure 10:
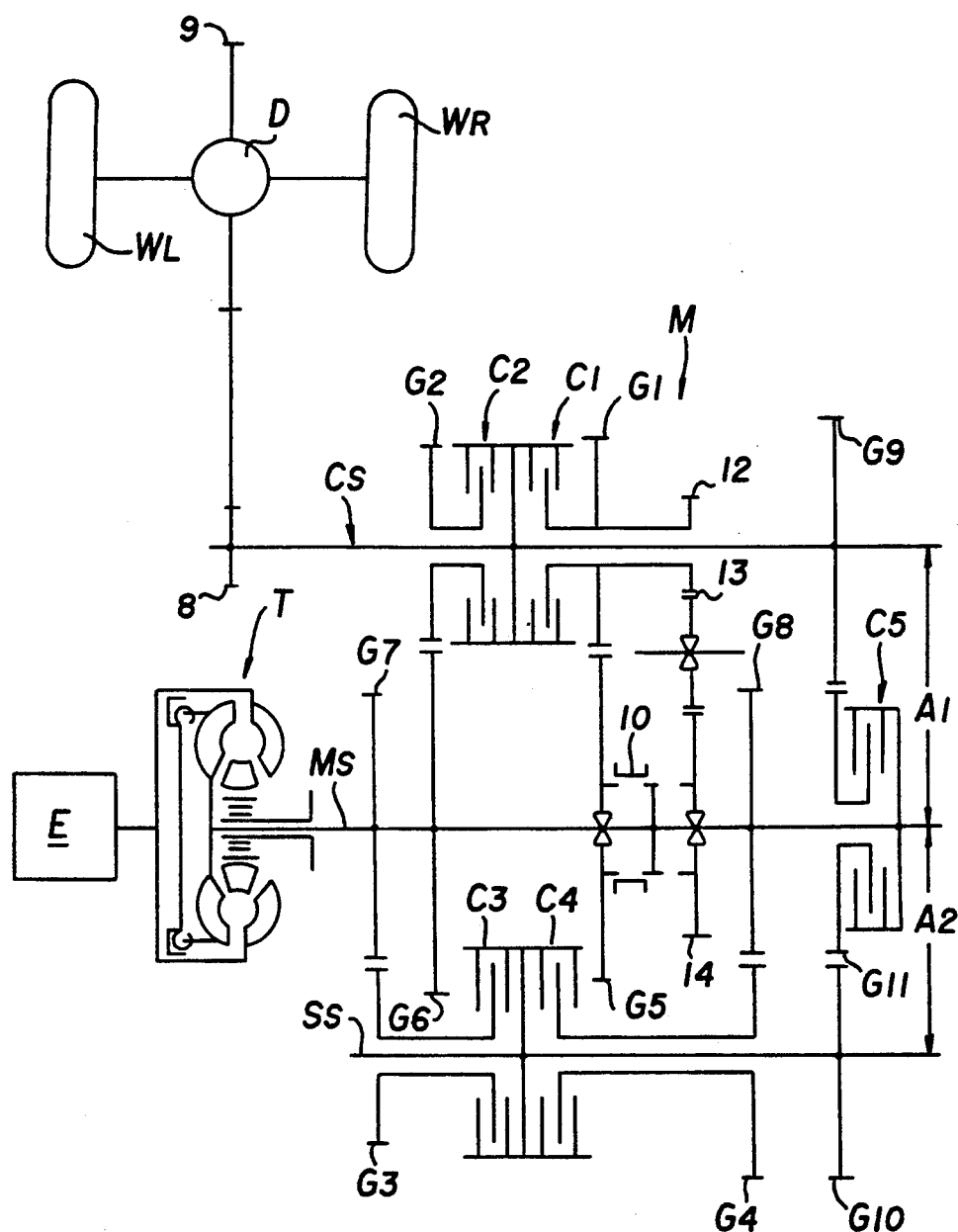
FIG. 10 is a schematic diagram showing a second modified form of the transmission of the instant invention.
Figure 11:
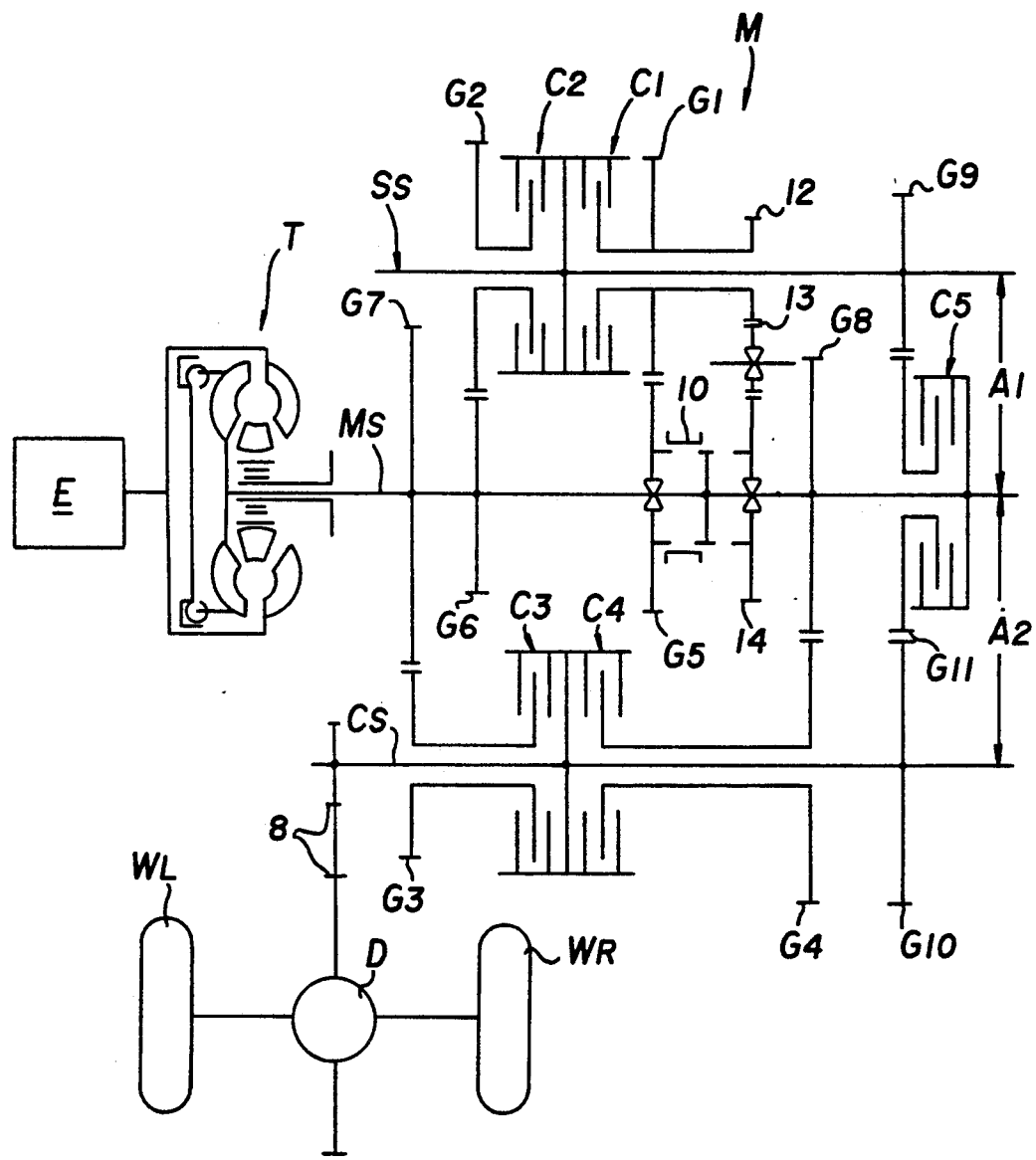
FIG. 11 is a schematic diagram showing a third modified form of the transmission of the instant invention.

In the automatic transmission M, input shaft Ms can be used as an output shaft Cs, while output shaft Cs can be used as an input Ms shaft. More specifically, as shown in FIGS. 10 and 11 by engaging third and fourth frictionally engaging elements $C_3$ and $C_4$, torque received from central output shaft Cs is delivered, through sub-shaft Ss and tenth, eleventh and ninth gears $G_{10}$, $G_{11}$, and $G_9$ to input shaft Ms. Likewise, by engaging fifth frictionally engaging element $C_5$, torque received from output shaft Cs is delivered through eleventh and ninth gears $G_{11}$ and $G_9$ to input shaft Ms, and, by engaging first and second frictionally engaging elements $C_1$ and $C_2$, torque received from output shaft Cs is delivered to input shaft Ms. In this case, it is of course necessary to properly modify the number of teeth of each gear.

FIG. 8 illustrates a second embodiment of the present invention. In this second embodiment, distance $A_1$ between input shaft Ms and output shaft Cs is equal to a distance $A_2$ between output shaft Cs and sub-shaft Ss, and eleventh gear $G_{11}$ is divided into two gears, i.e. gear $G_{11a}$, meshed with ninth gear $G_9$ and gear $G_{11b}$, meshed with tenth gear $G_{10}$. In this embodiment, ninth gear $G_9$ and gear $G_{11a}$ have the same number of teeth, and the number of teeth of gear $G_{11b}$ is set smaller than the number of teeth of tenth gear $G_{10}$.

With this second embodiment, it is possible not only to increase the degree of symmetry of input shaft Ms and sub-shaft Ss with respect to output shaft Cs, to further enhance the property for general purpose, but also to independently establish the gear shift ratio in the third gear shift and the gear shift ratios in the first and second gear shifts, thereby enhancing freedom of design.

Although the embodiments of the present invention have been described in detail, it will be understood that the present invention is not limited to these embodiments, and various modifications in design can be made without departing from the scope of the present invention as defined in the claims.

WHAT IS CLAIMED IS

1. A three-shaft type automatic transmission having a first shaft and a third shaft disposed in parallel on opposite sides of a central second shaft, comprising
first and second gears relatively rotatably carried on said first shaft, first and second frictionally engaging elements for selectively fixing said first and second gears to said first shaft, and a ninth gear secured to said first shaft;
third and fourth gears relatively rotatably carried on said third shaft, third and fourth frictionally engaging elements for selectively fixing said third and fourth gears to said third shaft, and a tenth gear secured to said third shaft; and fifth to eighth gears secured to said second shaft and meshed with said first to fourth gears, respectively, an eleventh gear relatively rotatably carried on said second shaft and meshed with said ninth and tenth gears, and a fifth frictionally engaging element for selectively fixing said eleventh gear to said second shaft.

2. A three-shaft type automatic transmission according to claim 1, wherein either one of said first and third shafts is an input shaft, and said second shaft is an output shaft.

3. A three-shaft type automatic transmission according to claim 1, wherein said second shaft is an input shaft, and either one of said first and third shafts is an output shaft.

4. A three-shaft type automatic transmission according to any one of claims 1 to 3, wherein said transmission includes a gear shift stage wherein said ninth to eleventh gears are omitted from a power transmitting path from said input shaft to said output shaft in a high speed gear shift stage, and a gear shift stage having said ninth to eleventh gears in said power transmitting path is a low speed gear shift stage.

5. A three-shaft type automatic transmission according to claim 1, wherein a gear shift stage established by engagement of said fifth frictionally engaging element has a gear ratio larger than 1.

* * * * *